(No Model.)  2 Sheets—Sheet 1.
J. F. WALLACE.
CAR COUPLING.
No. 269,358. Patented Dec. 19, 1882.
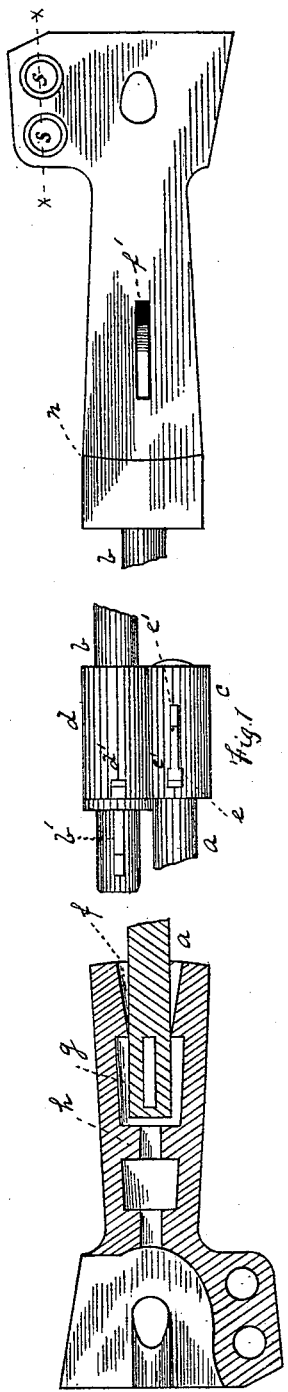
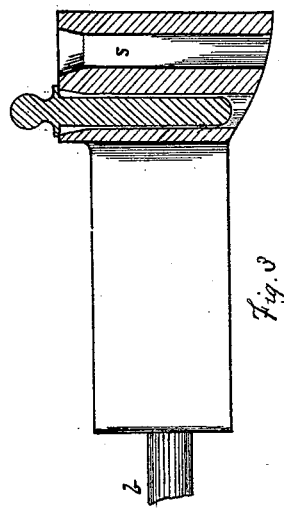
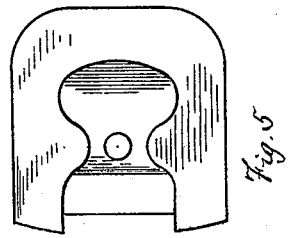
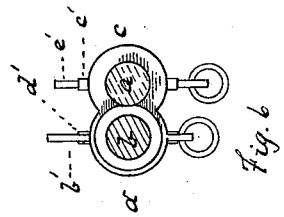
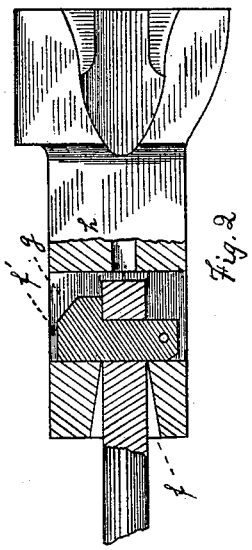
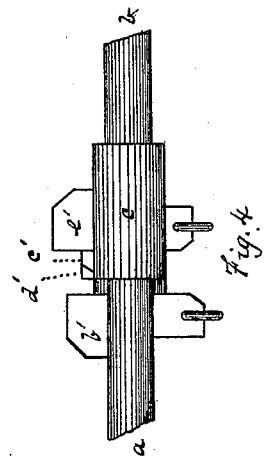
Witnesses.
R. C. Wrenshall
Jno. K. Smith.
Inventor.
John F. Wallace
by his attorneys
Bakewell & Kerr (No Model.) 2 Sheets—Sheet 2.

J. F. WALLACE.
CAR COUPLING.

No. 269,358. Patented Dec. 19, 1882.

Witnesses.
R. C. Trunshall
Jno. K. Smith

Inventor.
John F. Wallace
by his attorneys
Bakewell & Kerr

UNITED STATES PATENT OFFICE.

JOHN F. WALLACE, OF PITTSBURG, PENNSYLVANIA.

CAR-COUPLING.

SPECIFICATION forming part of Letters Patent No. 269,358, dated December 19, 1882.

Application filed March 15, 1882. (No model.)

*To all whom it may concern:*

Be it known that I, JOHN F. WALLACE, of Pittsburg, in the county of Allegheny and State of Pennsylvania, have invented a new and useful Improvement in Car-Couplings; and I do hereby declare the following to be a full, clear, and exact description thereof, reference being had to the accompanying drawings, forming part of this specification, in which—

Figure 7:
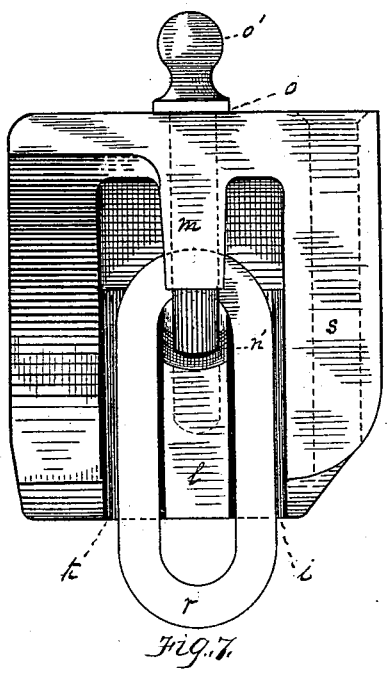
Figure 8:
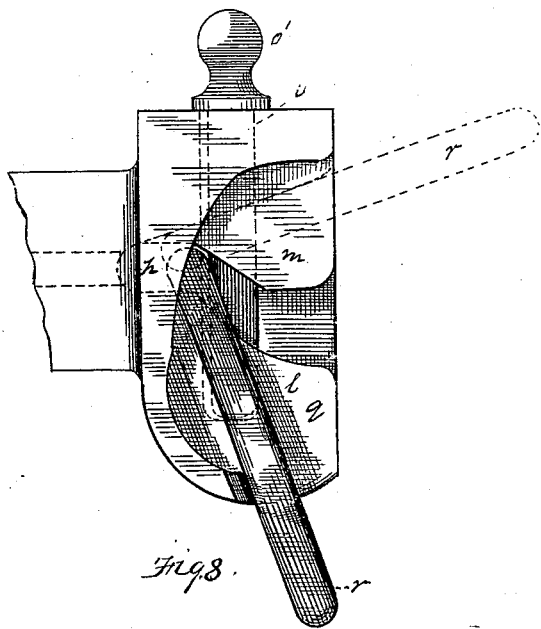

Figure 1 is a plan view of the draft-bolt coupler, and a plan view of the draw-head of one end of the car, and a horizontal sectional view of the draw-head at the other end of the car. Fig. 2 is a side elevation of the draw-head, showing in section the connection of the draft-bolt thereto. Fig. 3 is a side elevation of the draw-head in a section through the line $x\ x$ of Fig. 1. Fig. 4 is a side elevation of the draft-bolt coupler. Fig. 5 is an end view of the draw-head. Fig. 6 is a vertical cross-sectional view through the draft-bolt coupler. Fig. 7 is a side elevation of my improved draw-head, and Fig. 8 is a front elevation of the same.

Like letters of reference indicate like parts wherever they occur.

My invention relates to an improvement in devices for coupling railroad-cars; and it consists, first, in a coupling for joining draft-bolts at their ends in such a manner that the strain shall be distributed throughout the length of the draw-heads and draft-bolts, instead of being alone on any one part of the car; second, in an improvement in the draw-head designed to lessen the danger to brakemen in coupling cars.

I will now describe my invention so that others skilled in the art may manufacture and use the same.

In the drawings, $a$ and $b$ represent the two draft-bolts, which are made longer than has been customary, so that their ends may be coupled or attached to each other in such a manner as to allow them to have a certain motion independent of each other. This coupling device consists of the double cylinders $c$ $d$, which cylinders are cast in one piece, or may be attached to each other side by side. In the cylinder $c$ is a slot, $e$, through which the key $e'$ passes into and through a slot in the draft-bolt $a$, thereby firmly securing the end of the draft-bolt $a$ in the cylinder $c$. The draft-bolt $b$, however, passes in an opposite direction directly through the cylinder $d$, and is prevented from passing out of the same by a key, $b'$, which passes through the slot in the end of the draft-bolt $b$ beyond the cylinder $d$. Between the key $b'$ and the cylinder $d$ one or more washers may be placed on the draft-bolts $b$ to take up any lost motion. On the cylinders $c$ and $d$ are projections $c'$ $d'$, which afford support to the keys $b'$ and $e'$. The cylinder $d$ moves easily back and forth on the draft-bolt $b$, excepting as stopped by the key $b'$, when the strain or pull of the train is exerted when in motion. The draft-bolt $a$ being securely attached to the cylinder $c$, the usual motion of the draft-bolts is not interfered with.

In order to allow the draw-head to have a certain lateral movement to relieve the strain on the car, coupling-pin, link, and draw-head when the train is passing a curve, I attach the draft-bolt to the draw-head pivotally, as follows: In the rear end of the draw-head is a tapered opening, $f$, into and through which the end of the draft-bolt passes, and is keyed by a key, $f'$, in the opening or space $g$ forward of the tapered opening $f$. Forward of the opening $g$ is a partition or stop, $h$, against which the end of the draft-bolt strikes when in backing the car, and thereby prevents a sudden strain being exerted on the key $f'$. By these means the draw-head is allowed to have a sufficient lateral movement to prevent undue strain upon the coupling-pin and coupling devices. This is especially necessary in regard to my improvement in the draw-head, as will hereinafter more fully appear. The rear face of the draw-head is of slightly convex form, and rests against the follower on the draft-bolt, which follower has a concave surface, $n$, next to the draw-head, to allow of an easy lateral movement.

Extending backward from the face of the draw-head are two openings, $i$ and $k$, between which are the projections $l\ m$, which extend outward even with the face of the draw-head. Between the projections $m\ l$ is an opening, $n'$, for the link. Passing down from the top of the draw-head through the parts $l$ and $m$ is the coupling-pin hole $o$, through which the coupling-pin $o'$ passes. The top surface of the projection *l* inclines at a curve upward and ends in the space *p*. The lower surface of the projection *m* has a corresponding incline or curve. One side of the draw-head is cut away to form the opening *q*, which extends above the level of the top of the opening *i*, and the bottom of this opening also extends farther back than the lower portion of the opening *i*.

In coupling the cars the link *r* is passed into the opening *n'* and rises up on the incline of the projecting piece *l* until the back portion of the link is in the opening *p* above the lower portion of the projection *m*. The pin *o'* is then inserted and holds the link in place. When the cars are in motion the strain will then be in a line with the lower portion of the projection *m*, no matter whether the draw-heads of the cars are of different heights or not, thus affording a perfect support for and removing all strain directly from the coupling-pin; also, in passing curves the link will bear against either the projection *l m*, according to the height of the other car, and cannot work over them to the open side.

The purpose of the opening *p* at the side of the draw-head and its extending farther upward at its lower end and farther backward at its lower end than the opening *i* is to enable the brakeman to couple the cars without danger. The upper and lower ends of the opening *i* prevent the link from falling back to the lower end of the opening *q* and upward to the upper end thereof, leaving a sufficient space for the fingers of the brakeman.

The purpose of the openings *k* and *i* extending to the bottom of the face of the draw-head is to allow the link to fall back of the face of the draw-head when the car is uncoupled, thereby removing any danger of injury to the link by the cars coming together, the faces of the projections *l* and *m* and the solid side of the draw-head forming a bumping-face without any danger of bending or breaking either the pin or link.

In the solid side of the draw-head are formed one or more coupling-pin holes, *s*, which are designed for the coupling-pin when not in use, and a spare coupling-pin, thus affording a convenient and suitable place for carrying and keeping pins, and preventing a loss which so often occurs.

I have not described the springs and devices for attaching the different parts to the body of the car, as they may be of any suitable form, like those now in common use, and form no part of my invention.

The advantages of my invention are, first, the strain upon the different parts of the coupling devices and the car when in motion is distributed throughout the whole car, and not especially on any one part of the same, and also that, the draft-bolts passing each other or moving in a direction out of the line of each other, there is no danger of the end of either striking that of the other and bending the same.

The two cylinders *d* and *c*, instead of being placed side by side horizontally, may be placed one above the other.

The peculiar form of the draw-head gives strength to the pin and link, and acts as a guide to the link, and also does away to a great extent with the danger incurred by the brakeman in coupling the cars. This draw-head may be formed of cast or malleable metal, the form I have shown in the drawings representing a draw-head composed of iron or steel.

Having thus described my invention, what I claim, and desire to secure by Letters Patent, is—

1. A coupler for the ends of the draft-bolts of a railroad-car, consisting of a double draft-bolt case or cylinder united or formed together, one draft-bolt being firmly secured to said cylinders and the other draft-bolt being secured movably thereto, substantially as and for the purposes specified.

2. The combination, with the draw-heads of a car, of two draft-bolts, one connected to each draw-head, the free ends of the draft-bolts passing each other at the coupling-point, and a coupler for connecting the passing ends of the draft-bolts, substantially as and for the purpose specified.

3. The draw-head having two vertical openings formed in the face thereof, separated by two projections, one above the other, having a lateral opening inclining upward between them and a side opening larger than one of the vertical openings in the face of the draw-head, substantially as and for the purpose specified.

4. The draw-head having two vertical openings in its face, separated by two projections, one above the other, with a lateral link-opening inclining upward between the projections, in combination with a draft-bolt pivotally connected to the draw-head, substantially as and for the purpose specified.

In testimony whereof I have hereunto set my hand this 9th day of March, A. D. 1882.

JOHN F. WALLACE.

Witnesses:
 JAMES K. BAKEWELL,
 JAMES H. PORTE.